3,485,767
CALCIUM HALOPHOSPHATE PHOSPHOR
TREATMENT PROCESS
Herman F. Ogrinc, Moreland Hills, Ohio, assignor to
General Electric Company, a corporation of New York
No Drawing. Filed May 23, 1967, Ser. No. 640,559
Int. Cl. C01k 1/36
U.S. Cl. 252—301.4                     5 Claims

ABSTRACT OF THE DISCLOSURE

A process for the treatment of calcium halophosphate phosphors by washing with acidic ethylenediamine tetraacetate (EDTA) to remove undesirable materials which detract from the light-producing capabilities of the phosphor. Acidic EDTA is much more effective than ammoniated EDTA for such washing processes. Materials removed effectively from the phosphor include calcium salts such as calcium pyrophosphate, calcium orthophosphate and calcium metantimonate, antimony oxide, and manganese compounds. Appreciably brighter phosphor performance in lamps results from such washing, and much less EDTA can be used if in the acidic form than if ammoniated.

BACKGROUND OF THE INVENTION

The present invention relates to processes for treating halophosphate phosphors, including calcium halophosphate phosphors, by washing to remove undesirable materials. More particularly, it relates to such a process using ethylenediamine tetraacetic acid (EDTA).

In general, halophosphates are compounds more or less analogous to the natural mineral apatite and are considered to be represented by a formula such as $$3M_3(PO_4)_2 \cdot 1M'L_2$$

where L represents a halogen or mixture of halogens, and M and M' represent either different or identical alkaline earth metals or mixtures of such metals. Such artificially produced compounds, useful as luminescent materials or phosphors when suitably activated, are disclosed in Patent 2,448,733—McKeag et al., assigned to the assignee of the present invention. The most commonly used halophosphate phosphor is calcium halophosphate considered to have the following formula: $3Ca_3(PO_4)_2 \cdot Ca(F, Cl)_2$. Antimony and manganese are used as activators to contribute luminous emission bands respectively in the blue and oragne-red-regions. Various qualities of color temperatures of white light output are obtained by varying the proportions of the two activators.

The impurities themselves are produced in greater or lesser quantities depending on the precision with which the batch of materials used to produce the phosphor is measured. Calcium halophosphate phosphors are normally made by mixing $CaHPO_4$, $CaCO_3$, CdO, $CaF_2$, $NH_4Cl$, $MnCO_3$, and $Sb_2O_3$ together as a dry mixture and firing this mixture in trays at a temperature in the range of from 1000–1200° C. Undesirable compounds other than the calcium halophosphate phosphor which are formed during the firing are removed by various washing techniques known in the art.

Various acids and salts have been used previously to wash halophosphate phosphors to remove deleterious materials. Mineral acids as well as bases are disclosed in Patent 2,691,601—Butler et al. Patent 3,047,512—Martyny, assigned to the assignee of the present invention, discloses and claims the use of aqueous basic solutions of EDTA, particularly ammoniacal solutions of EDTA, either alone or in combination with amounts of maleic acid, in any case in a basic solution having a pH above 7.

EDTA is a well-known, widely used chelating agent, useful for removing various metal ions from solutions and suspensions. This effect is used both in industrial chemistry and in analytical chemistry. Normally the calcium ion is chelated by EDTA only at alkaline pH's. Removal of calcium ions is one of the main effects necessary in commercial washing of phosphors, particularly calcium halophosphate phosphors which are well known in the art. Thus, it can be expected that basic EDTA, such as ammoniated EDTA, would be necessary for effective EDTA washing of calcium halophosphate phosphors. Reasons necessitating washing such phosphors after production and before use in lamps, and the use of ammoniacal solutions of EDTA in such washing are well known in the art and are disclosed in the literature, including particularly the above-mentioned Patent 3,047,512. Among the undesirable materials which can be present in calcium halophosphate phosphor after manufacture but before washing are calcium pyrophosphate which acts as a diluent and does not produce light as effectively as does the calcium halophosphate phosphor itself, antimony or manganese-bearing calcium orthophosphate which absorbs ultraviolet radiation from the mercury arc in fluorescent lamps and prevents it from usefully exciting the phosphor itself, calcium metaantimonate which absorbs ultraviolet radiation nonproductively, and antimony oxide and manganese compounds which have deleterious effects on the maintenance of light output and can react with the mercury in the lamp tube to darken the body color of the phosphor layer and adversely affect lamp performance and the maintenance of light output. These compounds should be removed from the phosphor to such an extent that they no longer have a significant deleterious effect on performance of the phosphor or the lamps.

An object of the present invention is to provide an improved process for the washing of deleterious extraneous materials from calcium halophosphate phosphors so as to improve brightness and maintenance of such phosphors.

SUMMARY OF THE INVENTION

Briefly stated, the present invention in one form provides a process for improving the brightness and maintenance of alkaline earth halophosphate phosphors by washing with an acidic solution containing at least a small but effective amount of EDTA to remove undesirable impurities from the phosphor, separating the phosphor from the liquid, and rinsing the phosphor to remove residual EDTA.

Specific embodiments include using at least about 2.1 grams EDTA for each 2 kilograms of phosphor measured on a dry basis, using from about 8.4 to about 84 grams EDTA for each 2 kilograms of phosphor, and, preferably, using about 24 grams EDTA for each 2 kilograms of phosphor. Although acidic solutions of EDTA generally, meaning solutions having a pH or hydrogen ion concentration of less than 7 are suitable, a pH less than about 5 is preferred.

DESCRIPTION OF THE PREFERRED EMBODIMENTS

EDTA is normally supplied in two forms. The first is EDTA acid itself which is a solid. The second is the sodium salt of the acid. Sodium salts are deleterious to fluorescent lamp performance, so sodium EDTA could not normally be used as the EDTA source for production washing of calcium halophosphate phosphors.

SPECIFIC EXAMPLES

General variations within the invention have been all tried with equal success.

In one method, 2.0 kilograms (kg.) of calcium halophosphate phosphor activated with antimony and manganese are added to a vessel containing 30 liters (1.) of deionized water at ambient temperature, about 30° C. While agitating, 24 grams (gm.) acidic EDTA are added. This agitation is continued for a period of at least 45 minutes. The phosphor may be separated from the water either by centrifuging the slurry or by permitting the phosphor to settle and then decanting the liquid. After thorough washing, the phosphor cake is dried and further processed to make a suitable suspension.

Another method is to add 2.0 kg. of the same type of phosphor to 6 l. of hot deionized water. Then 8.4 gm. of EDTA are added to the slurry. This slurry is agitated for a period of about 45 minutes. The slurry then is centrifuged and the cake is washed with additional deionized water. The cake is dried and suspended for use as a lamp coating in ways known in the art.

A preferred method is to add 24 gm. acidic EDTA to 30 l. of hot deionized water, for instance at about 80° C. While agitating, add 2.0 kg. of this phosphor and allow slurry to continue to mix for about 45 minutes. After centrifuging the slurry, the halophosphate cake is washed with additional deionized water. The phosphor is dried in preparation for its suspension in a suitable binder which may be applied to a glass bulb wall.

From studies made in connection with the present invention, it appears that acidic EDTA operates in novel and particularly useful ways to remove undesirable materials from newly formed calcium halophosphate phosphors. It is known that minute amounts of antimony oxide on the surfaces of the phosphor, which are not removed by conventional washing processes, can be deleterious to lamp performance and maintenance of light output. Even very small amounts of such surface antimony compounds can be detected by passing hydrogen sulfide gas over moist phosphor cake. Any surface antimony compounds present will cause the white phosphor cake to change color, often turning yellow. The impurities of antimony and other materials can be deleterious to lamp performance even when present in such small quantities that they are difficult to detect by conventional analytical techniques.

Washing these phosphors in accordance with prior art techniques using ammoniated EDTA, acetic acid, mineral acids or ammonia is not considered to remove surface antimony compounds to the extent desired for optimum performance. Although tartaric acid can be used to effectively remove surface antimony compounds, washing with it can cause the phosphor body color to change to an undesirable gray during use in lamps. Ammonia and other non-chelating alkaline washes will not satisfactorily dissolve undesirable calcium compounds.

Contrary to normal practice in using EDTA, I have found that for washing halophosphate phosphors, particularly calcium halophosphate phosphors, acidic EDTA is much more effective than ammoniated EDTA, especially in removing deleterious minute traces of impurities. It would normally be expected that a high concentration of hydrogen ions would tie up the ethylenediamine tetraacetate ion, preventing it from effectively chelating calcium ions. However, it would appear in the practice of this invention that the solubilities of both acidic EDTA and the calcium phosphate impurities are mutually enhanced each by the presence of the other. It would appear that this is a synergistic effect and that it is probably specific to acidic EDTA in combination with calcium salts of weak acids such as singly and doubly ionized phosphoric acid.

As evidence of the effectiveness of the invention, phosphors washed according to the invention and in accordance with the prior art have been used in making lamps and the light production characteristics of the lamps compared. Also, concentrations of dissolved impurities of the wash liquids have been compared. Data on these comparisons are presented in Table I below. In the treatment column, hot means about 80° C., warm about 50–55° C., and cold about 25–30° C. EDTA concentrations are given in grams for each 2 kg. of phosphor. 100 hr. l.p.w. means the lumens per watt measured in a standard 40-watt fluorescent lamp after 100 hours of lamp operation. Filtrate analyses were not made where a dash (—) appears. The last column shows which treatments left detectable antimony on the phosphors. A plus sign (+) indicates the presence of soluble antimony, and a minus sign (—) indicates its absence.

TABLE I.—RESULTS OF ANALYSES AND LAMP DATA

| Treatment | 100 hr. l.p.w. | Filtrate analysis, p.p.m. Ca | Detection of soluble Sb on Phosphor |
|---|---|---|---|
| (1) (No treatment) | 80.4 | | + |
| (2) Hot H₂O only | 81.5 | 2 | + |
| (3) Warm H₂O+ammonia | 81.7 | 0 | + |
| (4) Warm H₂O+acetic acid | 83.3 | 159 | + |
| (5) 21 gm. acidic EDTA, cold | 83.3 | 149 | — |
| (6) 8.4 gm. acidic EDTA, cold | 84.0 | | — |
| (7) 21 gm. acidic EDTA, hot | 83.9 | 155 | — |
| (8) 8.4 gm. acidic EDTA, hot | 83.7 | 78 | — |
| (9) 21 gm. ammoniated EDTA, cold | 83.4 | 38 | + |
| (10) 8.4 gm. ammoniated EDTA, cold | 83.0 | 30 | + |
| (11) 21 gm. ammoniated EDTA, hot | 83.4 | 19 | + |
| (12) 8.4 gm. ammoniated EDTA, hot | 83.6 | 30 | + |

Table I demonstrates substantially improved analytical and lamp results from use of the invention.

Table II demonstrates that various concentrations of acidic EDTA within the invention do not significantly change the color of the phosphor's light emission (given in ICI color coordinates $x$ and $y$), and that the brightness and ultraviolet absorption are satisfactory even when the wash contains only 2.1 gm. acidic EDTA per 2 kg. phosphor. This shows that the lower limit of acidic EDTA for effectiveness is not known; thus, it is stated to be a small but effective amount to remove undesirable impurities. Brightness and UV absorption are given as percentages of arbitrary standards.

TABLE II.—EFFECTS OF VARYING EDTA CONCENTRATION

| Treatment | Acid EDTA concentration (gm./2 kg. phosphor) | Plaque brightness (percent) | UV absorption (percent) | ICI color x | ICI color y |
|---|---|---|---|---|---|
| 13 | 8.4 | 104.2 | 93.4 | .382 | .390 |
| 14 | None | 100 | 94.4 | .373 | .375 |
| 15 | 8.4 | 105.7 | 93.9 | .384 | .390 |
| 16 | 6.3 | 105.4 | 93.5 | .384 | .390 |
| 17 | 4.2 | 104.8 | 94.2 | .383 | .390 |
| 18 | 2.1 | 104.5 | 94.3 | .384 | .389 |

For purposes of comparison, treatment 13 used ammoniated EDTA, and treatment 14 used no wash at all.

What is claimed is:

1. A process for improving the brightness and maintenance of calcium halophosphate phosphors which comprises thoroughly agitating the phosphor in an acidic solution containing at least a small but effective amount of ethylenediamine tetraacetic acid for the purpose of removing undesirable materials from the phosphor, separating the phosphor from the liquid, and rinsing the phosphor to remove residual ethylenediamine tetraacetic acid.

2. A process of claim 1 wherein the solution contains at least about 2.1 grams ethylenediamine tetraacetic acid for each 2 kilograms of phosphor.

3. Method of claim 1 wherein the solution contains about from 8.4 grams to 84 grams ethylenediamine tetraacetic acid for each 2 kilograms of phosphor.

4. Method of claim 1 in which the solution contains about 24 grams of ethylenediamine tetraacetic acid for each 2 kilograms of phosphor.

5. Method of claim 1 in which the solution has a pH of less than about 5.

References Cited

UNITED STATES PATENTS 3,047,512  7/1962  Martyny.
3,384,598  5/1968  Friedman et al.

TOBIAS E. LEVOW, Primary Examiner

R. D. EDMONDS, Assistant Examiner